United States Patent [19]

McInerney et al.

[11] Patent Number: 4,558,739

[45] Date of Patent: Dec. 17, 1985

[54] SITU MICROBIAL PLUGGING PROCESS FOR SUBTERRANEAN FORMATIONS

[75] Inventors: Michael J. McInerney; Gary E. Jenneman; Roy M. Knapp; Donald E. Menzie, all of Norman, Okla.

[73] Assignee: The Board of Regents for the University of Oklahoma, Norman, Okla.

[21] Appl. No.: 482,316

[22] Filed: Apr. 5, 1983

[51] Int. Cl.$^4$ .................. E21B 43/22; E21B 33/138
[52] U.S. Cl. .................. 166/246; 166/292; 166/294; 435/242
[58] Field of Search .................. 166/246, 292, 294; 405/263, 264; 435/242

[56] References Cited

U.S. PATENT DOCUMENTS

| | | | |
|---|---|---|---|
| 2,660,550 | 11/1953 | Updegraff et al. | 166/246 |
| 2,807,570 | 11/1957 | Updegraff | 166/246 |
| 3,118,500 | 1/1964 | Maddox et al. | 166/246 |
| 3,185,216 | 5/1965 | Hitzman | 166/246 |
| 3,305,016 | 2/1967 | Lindblom et al. | 166/246 |
| 3,312,279 | 4/1967 | Hitzman | 166/246 |
| 3,326,286 | 6/1967 | Harvey | 166/246 |
| 3,332,487 | 7/1967 | Jones | 166/246 |
| 3,391,060 | 7/1968 | McNeely . | |
| 3,598,181 | 8/1971 | Wegner et al. | 166/246 |
| 3,650,326 | 3/1972 | Hitzman | 166/246 |
| 3,966,618 | 6/1976 | Colegrove | 252/8.55 D |
| 4,096,073 | 6/1978 | Hitzman | 252/8.55 D |
| 4,119,546 | 10/1978 | Wernau | 252/8.55 D |
| 4,128,482 | 12/1978 | Knight | 252/8.55 D |
| 4,141,842 | 2/1979 | Abdo | 252/8.55 D |
| 4,332,297 | 1/1982 | Sandiford | 166/270 |
| 4,352,741 | 10/1982 | Wernau | 252/8.55 D |
| 4,460,043 | 7/1984 | Thompson et al. | 166/246 |
| 4,475,590 | 10/1984 | Brown | 166/246 |

FOREIGN PATENT DOCUMENTS 89580 11/1958 Netherlands .

OTHER PUBLICATIONS

B. Bubela, Physical Simulation of Microbiological Enhanced Oil Recovery In: *Microbial Enhanced Oil Recovery*, J. E. Zajic, D. G. Cooper, T. R. Jack, and N. Kosarie, eds. Penn Well Books, Tulsa, OK, pp. 1-7, (1983).
D. M. Updegraff (1), The Effect of Microorganisms on the Permeability and Porosity of Petroleum Reservoir Rock, ibid, pp. 37-44.
T. R. Jack et al. (1), Patents Employing Microorganisms in Oil Production, ibid, pp. 14-25.
L. K. Jang et al. (1), Preliminary Investigation on the Transport Problems of Microorganisms in Porous Media, ibid, pp. 45-49.
I. Lazar (1), Some Characteristics of the Bacterial Inoculum Used for Oil Release from Reservoirs, ibid, pp. 73-82.
V. Moses et al. (1), Toward Microbial Recovery from North Sea Reservoirs, ibid, pp. 150-155.
W. Xiuyuan, A Microbial Polysaccharide Produced from Crude Oil or Liquid Paraffin and its Application in Petroleum Industry, In: *Proceedings of 1982 Internat'l. Conference on Microbial Enhancement of Oil Recovery*, E. C. Donaldson and J. B. Clark (eds.), U.S. Dept. of Energy, Bartlesville, OK, pp. 29-37, (1983).
E. A. Grula et al., Isolation and Screening of Clostridia for Possible Use in Microbially Enhanced Oil Recovery, ibid, pp. 43-47.
L. K. Jang et al. (2), An Investigation of the Transport of Bacteria through Porous Media, ibid, pp. 60-70.
G. E. Jenneman et al., Transport Phenomena and Plugging in Berea Sandstone Using Microorganisms, ibid, pp. 71-75.

(List continued on next page.)

*Primary Examiner*—George A. Suchfield
*Attorney, Agent, or Firm*—Dunlap, Codding & Peterson

[57] ABSTRACT

Subterranean paths of water flow are impeded or changed by the facilitation of microbial growth therein. Either indigenous bacterial growth may be stimulated with nutrients or the formation may be first seeded with bacteria or their spores which inhibit fluid flow after proliferation. These methods and bacteria are usable to alter the flow of water in a waterflooded oil formation and to impede the outflow of contaminated water.

75 Claims, 2 Drawing Figures

OTHER PUBLICATIONS

D. M. Updegraff (2), Plugging and Penetration of Petroleum Reservoir Rock by Microorganisms, ibid, pp. 80–85.

T. R. Jack et al. (2), The Potential for Use of Microbes in the Production of Heavy Oil, ibid, pp. 88–93.

Z. Zhaochen et al., A Survey of Research on the Application of Microbial Techniques to Petroleum Production in China, ibid, pp. 135–139.

H. F. Yarbrough et al., Microbially Enhanced Oil Recovery from the Upper Cretaceous Nacatoch Formation, Union County, Arkansas, ibid, pp. 149–153.

V. Moses et al. (2), Microbial Enhancement of Oil Recovery in North Sea Reservoirs: A Requirement for Anaerobic Growth in Crude Oil, ibid, pp. 154–157.

D. G. Springham et al., Some Constraints on the Use of Bacteria in Enhanced Oil Recovery, ibid, pp. 158–161.

D. O. Hitzman, Petroleum Microbiology and the History of its Role in Enhanced Oil Recovery, ibid, pp. 162–218.

F. B. Plummer et al., 1944, Effect of Certain Microorganisms on the Injection of Water into Sand, Petroleum Technol. Pubs. AIME No. 1678: 1–13.

O. D. O'Bryan et al., 1949, The Effect of the Bacteris *Vibrio Desulfuricans* on the Permeability of Limestone Cores, Texas J. of Sci. 1: 117–128.

R. T. Hart et al., The Plugging Effect of Bacteria in Sandstone Systems, Can. Mining Met. Bull. 53: 495–501, (1960).

P. J. Kalish et al., The Effect of Bacteria on Sandstone Permeability, J. Petr. Technol. 16: 805–814, (1964).

J. T. Raleigh et al., A Study of Formation Plugging with Bacteria, J. Petr. Technol. 17: 201–206, (1965).

G. E. Myers et al., Bacteria Can Penetrate Rock, Can. J. Microbiol., 12: 477–484, (1965).

W. R. Finnerty et al., Microbial Enhancement of Oil Recovery, Bio/Technol. 1: 47–54, (1983).

J. B. Davis, Petroleum Microbiology, Elsevier Publishing Co., Amsterdam, pp. 453–461, (1967).

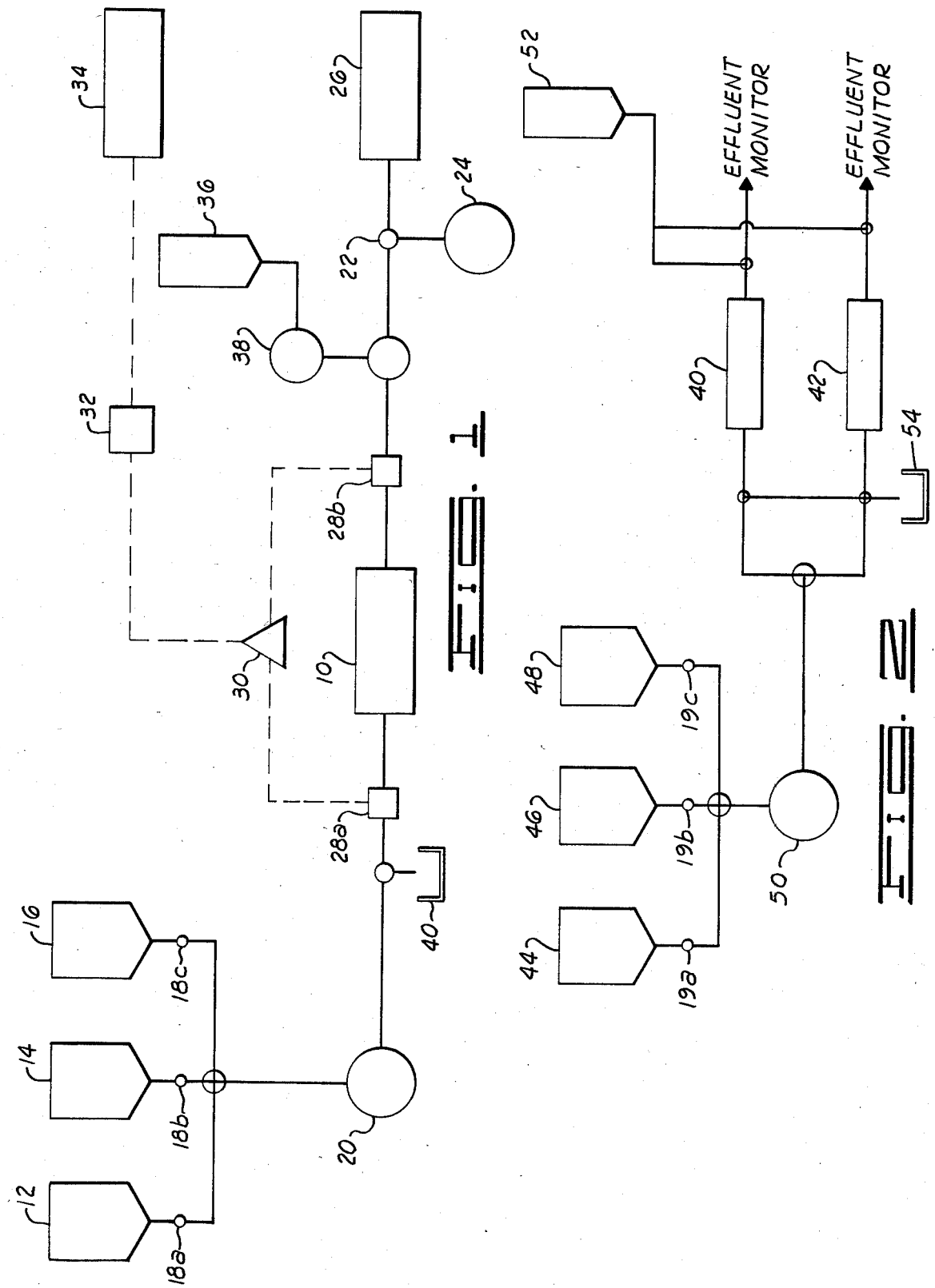

SITU MICROBIAL PLUGGING PROCESS FOR SUBTERRANEAN FORMATIONS

BACKGROUND OF THE INVENTION

1. Field of the Invention

The present invention relates generally to a process for plugging subterranean flow paths of aqueous solutions and more particularly, but not by way of limitation, both to correction of permeability variation in oil-bearing formations and to the prevention of aqueous contaminant outflow at sites of subterranean contamination.

2. Description of Prior Art

Available prior art is primarily associated with correction of permeability variation in waterflooded oil fields. After injection of water into a subterranean oil-bearing formation to drive oil toward a recovery well, a problem of stratification frequently occurs because of permeability variation in oil-bearing rock formations. Stratification arises when injected water flows along the subterranean paths of least resistance, forming waterswept zones, and bypasses many zones of embedded oil. The waterswept zones are depleted of recoverable oil before the bypassed zones and the oil yield of continued waterflooding dramatically decreases.

One approach to the correction of permeability variation that causes oil field stratification has been the injection of inert plugging agents such as cement, colloidal clays, organic resins and gels (see for example, Danielson et al, Producers Monthly 15 No. 1, p. 15 [November, 1950]). U.S. Pat. No. 3,844,348, issued to Stratton, discloses a method of reducing the fluid permeability of a porous subterranean formation by treatment with a Xanthomonas derived heteropolysaccharide modified by addition of a synthetic polymer.

U.S. Pat. No. 3,340,930, issued to Hitzman, discloses a method of enhancing oil recovery by injection of oil-metabolizing and detergent-producing bacteria of the classes Actinomycetales and Schizomycetes.

SUMMARY OF THE INVENTION

A process for selectively impeding the flow of aqueous fluid through a permeable subterranean formation including, first, provision of at least one access from the earth's surface to the subterranean formation. A source of bacterial nutrients capable of sustaining bacterial proliferation is then connected to at least one access. A quantity of the culture medium is then injected into the subterranean formation.

BRIEF DESCRIPTION OF THE DRAWINGS

FIG. 1 is a schematic diagram of the flow of materials in the present invention.

FIG. 2 is a schematic diagram of the flow of materials in a dual core embodiment of the present invention.

DESCRIPTION OF THE PREFERRED EMBODIMENT

The method of the present invention is particularly adapted to plug subterranean paths of aqueous liquid flow. The subterranean induction of bacterial proliferation involving the introduction of bacterial nutrients serves to stimulate both bacterial proliferation and the production of bacterial metabolites. The proliferated bacteria and certain of their metabolites impede the flow of aqueous liquids through zones of proliferation and metabolism.

In the process of petroleum recovery from subterranean formations there often comes a point when the process of pumping no longer yields adequate amounts of oil. Among the methods of secondary oil recovery is the process of waterflooding. Waterflooding generally involves the forcing of available water or brine into a partially oil-depleted formation to force oil to the surface. Frequently a number of wells exist in an oil formation and water or brine will be forced into more peripheral wells and withdrawn at a more centralized well. The withdrawn water usually contains a portion of oil which is separated and recovered.

During such waterflooding, the water passes along paths of least resistance and clears the oil therefrom. Oil output subsequently decreases as water continues to pass through stratified zones already substantially cleared of oil. One method of reinvigorating the output of oil would be to alter the patterns of subterranean waterflow by at least partially plugging the paths of least resistance to waterflow. One method of plugging these paths would be to facilitate the growth and metabolism of microorganisms therein. Proliferating microorganisms should themselves impede waterflow and certain secreted macromolecular metabolic products, especially those at least partially insoluble in water should aid in plugging these paths of waterflow. When the paths of waterflow are injected with bacterial nutrients, indigenous microorganisms should proliferate, preferably during a period of sealing when substantially all injection of aqueous fluids is ceased for a period from about one day to about ten days. This proliferation should selectively impede the flow of aqueous fluid through a permeable subterranean formation, thereby forcing the aqueous fluid through previously unpermeated paths rich in unflushed oil. The previously unflushed oil should now be carried to the surface with the water-flood output.

In certain situations an aqueous fluid comprising at least one substance having deleterious environmental effects may be entering or threatening to enter a permeable subterranean formation. This subterranean formation may, for example, lead to a supply of drinking or irrigation water. The percolation of said deleterious substance through the formation could be impeded by providing access thereto and injecting bacterial nutrient to facilitate growth therein of indigenous bacteria.

A bacterial nutrient technically and economically suitable for subterranean injection would be one comprising a source of metabolizable carbon, about 1% by weight, selected, for example, from the group consisting of molasses, grain wort and grain malt. This nutrient should also contain a source of metabolizable nitrogen, about 0.1% by weight, selected, for example, from the group consisting of alkali metal nitrates, alkali ammonium salts, ammonia, protein hydrolysates, protein digests, protein peptones and corn steep liquor.

The above bacterial nutrients are suitable for facilitating the growth of indigenous bacteria or for the later mentiond specific bacterial strains or their spores which may be first injected into the subterranean formation.

While access must usually be provided, preferably by drilling a well, for impeding subterranean flow of deleterious substances, in the case of a waterflooded oil formation, access is usually already present as water input wells.

The sealing process mentioned earlier is also applicable to any subterranean formation after injection of bacterial nutrient to facilitate growth or proliferation of indigenous bacteria or of aqueously suspended viable bacteria or their spores previously injected through at least one access into the subterranean formation.

When an aqueous suspension of viable bacteria is first injected from a provided source into a subterranean formation, the bacteria may initially be more thoroughly dispersed into the formation. A source of bacterial nutrient, preferably as that mentioned above, is first diluted so that it is capable of sustaining bacterial viability while being inadequate for inducing bacterial proliferation. This source of diluted bacterial nutrient is connected to at least one access to the subterranean formation and, following the injection of bacteria, is injected into the subterranean formation to disperse viable unproliferating bacteria within the formation. Following this dispersion, bacterial nutrient capable of facilitating bacterial proliferation will be injected to facilitate bacterial proliferation, followed preferably during the period of sealing mentioned earlier.

Bacterial spores, being smaller than their parent bacteria, may be particularly applicable to impede the flow of aqueous fluids in certain situations. These spores may be injected from a source of aqueously suspended spores into a subterranean formation and followed by a bacterial nutrient to induce spore germination and bacterial proliferation. Spore dispersion may be facilitated by injection of a brine capable of sustaining spore viability while being inadequate for inducing spore germination prior to nutrient injection.

Bacterial spores, preferably those of Bacillus strain BCI-1 (ATCC No. 39306) are usable in the manner above defined and analogous to the above discussed viable bacteria, for selectively impeding the flow of aqueous fluid through permeable subterranean formations.

A number of experiments on a laboratory scale were performed to demonstrate the feasibility of the above discussed approach to impeding subterranean fluid flow and are listed below as Examples 1 to 6. The following examples were performed using Berea sandstone cores obtained from Cleveland Quarries (Amherst, Ohio) and cut into 2×8 inch cores with a coring device. The cores were either steam-cleaned for two weeks and then dried or were used as received.

Each core was coated along its entire lateral surface with an epoxy resin cast in a resin mold (Evercoat Fiberglass Resin) and cut to appropriate lengths. The encased cores were then mounted in a holder with Plexiglass end plates having ports for the connection of Nylon tubing.

All bacterial strains utilized herein have been registered with the American Type Culture Collection, Rockville, Md., and have received ATCC numbers.

FIG. 1 is a schematic representation of a system used to monitor the flow of liquids and their constituents through a mounted sandstone core 10. In communication with the mounted sandstone core 10 are a bacteria reservoir 12, a sterile brine reservoir 14 and a nutrient reservoir 16. Each of the reservoirs is connected to a valve 18 so that the contents of each may independently be transferred to the mounted sandstone core 10 via a pump 20.

Effluent from the mounted sandstone core 10 passes by the sensing device 22 of a flowmeter 24 and then to a fraction collector 26.

Taps 28a, 28b are connected to liquid entering and effluent exiting the mounted sandstone core 10. The taps are connected to a pressure transducer 30 (Validyne DP-15) whose signal is transferred to a signal demodulator 32 the output of which is transferred to a chart recorder 34 where comparative pressures are recorded. Permeability of the core 10 was measured throughout by monitoring the flow of sterile brine therethrough. When core 10 backflushing with sterile brine is conducted, brine from a backflushing brine reservoir 36 is passed via a pump 38 to backflush the core 10 and exits the system to a waste container 40. This basic system was used in the following examples as indicated.

EXAMPLE 1

Nutrient Flow

Cores used in the nutrient flow experiment ranged from 17 to 21 cm. in length, had permeabilities ranging from 300 to 400 millidarcy (md) and had porosities of about 17%. These cores were not steam-cleaned, but were sterilized with 2,000 ppm Oxine (chlorine dioxide solution, Biocide Chemical Co.) for two hours prior to the experiment.

Each core was equilibrated with sterile brine containing 2% (w/v) NaCl and 0.01% (w/v) $CaCl_2$ and then a nutrient solution of 1,560 ppm glucose, 100 ppm $(NH_4)_2SO_4$ and 150 ppm $Na_2HPO_4$ dissolved in the above-described sterile brine was pumped through the core at a rate of 2.03 ml/min. Effluent fractions were collected and pooled in equal core pore volumes (PV) and colorimetrically analyzed for glucose, phosphate and ammonia nitrogen. It was found that the effluent concentrations of ammonia nitrogen and glucose reached their original concentrations in about the fourth PV of effluent. The effluent phosphate reached about 80% of its initial concentration after the seventh PV and remained there through the sixteenth PV (the last collected fraction).

A protein solution, 100 ppm Bacto-Peptone (Difco), in sterile brine, was passed at 1.96 ml/min, through cores, either equilibrated with brine, or saturated with crude oil and then equilibrated with brine, and the protein in the effluent was colorimetrically monitored. It was found through 16 PV of effluent that the protein concentration was only gradually rising and maximally attained only about 30% of the original concentration.

These nutrient experiments indicate that a protein source of carbon and nitrogen will not efficiently permeate sandstone to act as a transported bacterial nutrient, as contrasted with the comparatively low molecular weight nutrients previously mentioned.

EXAMPLE 2

Indigenous Microbes

The evaluation of many experiments concerning the sandstone cores is complicated by the presence of indigenous microbes in these cores. Indigenous microbial populations including Actinomycetes and genera such as Pseudomonas and Bacillus were observed in every core utilized in all these experiments. Even after steaming for 2 weeks, autoclaving (15 psig, 121° C.) for 12 hours and drying at 121° C., $10^3$ to $10^4$ cells per ml of viable indigenous microbial populations remained. The use of chlorine dioxide impregnation reduces indigenous microbial populations for one to two days, or until nutrient is added.

Core No. 7 was 4 cm in length with a permeability of 171 md and a porosity of 17% and was steam cleaned.

One PV of Tryptic Soy Broth (Difco) containing 2% (w/v) NaCl, 0.01% (w/v) $CaCl_2$ and 0.1% (w/v) $NaNO_3$ was passed into core No. 7 and the core was then sealed and incubated for three days at 25° C. The original permeability of the core was decreased by about 40% when measured after this three day incubation.

After backflushing the core with 2 PV of sterile brine, the permeability was remeasured and was 34% of the original permeability. Additional pumping of brine in the original direction resulted in a gradual reduction over the next 100 PV to about 50% of the original permeability.

This experiment illustrates the plugging effects induced by indigenous microorganisms when provided with nutrient.

EXAMPLE 3

Plugging With Bacillus Strain 47

A thermotolerant Bacillus, strain 47 (ATCC No. 39305), was obtained from the culture collection of the Department of Botany and Microbiology, University of Oklahoma. The Bacillus strain 47 was aerobically cultured at 50° C. in a sterilized medium of 1% (w/v) yeast extract (Difco); 5% (w/v) NaCl; 0.1% (w/v) $(NH_4)_2SO_4$; 0.025% (w/v) $MgSO_4$; 1% (w/v) sucrose; 100 mm phosphate buffer, pH 7.0, and 1.0% trace metal solution (the trace salt solution contained the following (mg/ml) EDTA, ethylenediamine tetracetic acid 1.0; $MnSO_4$, 3.0; $FeSO_4$, 0.1; $CaCl_2$, 0.1; $CoCl_2$, 0.1; $ZnSO_4$, 0.1; $CaSO_4$, 0.01; $AlK(SO_4)_2$, 0.01; $H_3BO_4$, 0.01; and $NaMoO_4$, 0.01, as defined in Clark et al, Devel. Indust. Microbiol. (1981) V. 22, p. 695–701). Cells in the log growth phase were harvested by centrifugation and washed with sterile brine containing 2% (w/v) NaCl and 0.1% (w/v) $CaCl_2$ prior to suspension for use.

A Berea sandstone core, having been steam cleaned, was encased in epoxy resin, cut to 11.1 cm. in length and mounted in flow monitoring system as seen in FIG. 1. The mounted core had a porosity of 18% and a permeability of 488 md.

The core 10 was first injected with 33 PV (pore volume) of sterile brine containing $10^3$ Bacillus strain 47 cells per ml from the bacteria reservoir 12 which resulted in a permeability reduction of 30%. One PV of bacterial nutrients, the sterile culturing medium described above, was then injected into the core 10 from the nutrient reservoir 16. The core 10 was then sealed and incubated at 50° C. for 48 hours. Sterile brine from a reservoir 14 was then pumped through the core 10 and permeability of the core was found to be reduced by 80%. After backflushing the core 10 with 3 PV of brine, the flow of 45 PV of brine from the brine reservoir 14 resulted in a core 10 permeability increase of about 5% (i.e., now 25% of the original permeability of the core). Storage of the core 10 for one day at 4° C. did not alter the permeability, but subsequent flushing with 7 PV of brine from the brine reservoir 14 increased the permeability by about 9%. The injection of another PV of nutrient from the nutrient reservoir 16, followed by sealing and an incubation at 50° C. for 40 hours, resulted in no significant permeability changes.

This example demonstrates the usefulness of the procedure in a core model experiment with a particular thermotolerant bacteria, Bacillus strain 47, potentially useful in subterranean formations having temperatures elevated to about 50° C.

EXAMPLE 4

Plugging With Pseudomonas Strain I-2

Pseudomonas strain I-2 (ATCC No. 39304) was isolated as a pure culture from tap water and initially cultured in Tryptic Soy Broth (Difco). The initial Pseudomonas culture was then aerobically subcultured in Tryptic Soy Broth (Difco) with 2% (w/v) NaCl. Pseudomonas strain I-2 cells in the log growth phase were centrifugally harvested and washed once in a sterile brine solution containing 2% (w/v) NaCl and 0.1% (w/v) $CaCl_2$. The Pseudomonas cells were then suspended in sterile brine [2% (w/v) NaCl and 0.1% (w/v) $CaCl_2$] at a concentration of $9.3 \times 10^4$ cells per ml.

A Berea sandstone core 10, not steam cleaned, 4 cm in length and having a porosity of 17% and permeability of 488 md was mounted in a flow monitoring system as schematically represented in FIG. 1.

From the bacteria reservoir 12, 126 PV of the Pseudomonas suspension was injected into the core 10. One PV of a first nutrient of Tryptic Soy Broth with 2% (w/v) NaCl and 0.1% (w/v) $NaNO_3$ was next injected into the core 10. The core 10 was then aseptically disassembled, sealed and incubated at 25° C. for 4 days.

The core 10 was then reassembled in the flow monitoring system and sterile brine from the brine reservoir 14 was pumped therethrough and about a 70% reduction of the original permeability was noted. After a brief backflushing with sterile brine, the first brine flow was resumed and the permeability had increased to about 60% of the original permeability and remained stable for about 40 PV of brine flow.

One PV of the first nutrient, now enriched with 1% (w/v) sucrose was injected into the core 10 from the nutrient reservoir 16 and the core 10 was aseptically disassembled and incubated at 25° C. for 2 days. Upon the resumption of brine injection from the brine reservoir 14 a permeability of only 20% of the original permeability was observed. Backflushing and resumed flushing with brine finally increased permeability to about 36% of that of the original core 10.

This example indicates the usability of Pseudomonas strain I-2 in the plugging of subterranean formations and also the feasibility of flushing with an enriched nutrient to enhance plugging.

EXAMPLE 5

Plugging With Bacillus Strain BCI-1

Bacillus strain BCI-1 (ATCC No. 39306) is a thermotolerant slime-producing rod-shaped bacteria isolated as a pure culture from core effluent. This organism is spore-forming, grows either as an aerobe or a facultative anaerobe and also is streptomycin-resistant. Cells were cultured in a nutrient composed of 5% (w/v) NaCl, 0.1% (w/v) $(NH_4)_2SO_4$, 0.025% (w/v) $MgSO_4$, 1% (w/v) sucrose, 100 mM phosphate buffer (pH 7.0), 0.05% (w/v) yeast extract (Difco) and 1.0% (w/v) trace metal solution (as described in Example 3). Cells were centrifugally harvested in the log growth phase. Harvested cells were washed once with a sterile brine containing 2% (w/v) NaCl and 0.1% (w/v) $CaCl_2$ and a cell suspension having $1 \times 10^5$ cells/ml was prepared in this sterile brine.

The core 10 mounted in the flow monitoring system was about 12 cm in length, had a porosity of about 17%, a permeability of 439 md and had been steam cleaned.

About 8 PV of the above-described cell suspension were injected from the bacteria reservoir 12 into the core 10. A sterile dilute nutrient solution (1:10 dilution of the above culture nutrient with water), sufficient to viably sustain the cells without inducing cell proliferation and containing 1 gm streptomycin per liter was then injected into the core 10 from the nutrient reservoir 16 for a period of about 12 hours. The purpose of the streptomycin was to suppress the growth of core 10-indigenous bacteria. The purpose of the dilute culture nutrient was to disperse injected cells throughout the core 10.

An undiluted nutrient (see the above-described culture nutrient) containing 1 gm streptomycin per liter was then injected into the core 10 for a period of about 12 hours. After the core 10 was sealed for a period of 52 hours, the core 10 permeability was measured with sterile brine and found to be only about 8% of the original permeability. The core 10 was then sealed for a period of 17 days and the permeability then remeasured and found to be about 73% of the original permeability. This indicates that cell death and lysis may reverse the plugging effects.

The flow of undiluted nutrient noted above was reinitiated for about 7 hours, the core 10 then sealed for 11 hours and the permeability remeasured and found to be less than about 3% of the original permeability. Backflushing did not significantly alter this reduced permeability.

This experiment indicates the particular suitability of Bacillus strain BCI-1 for plugging sandstone and illustrates the enhancement of cellular penetration into the core 10 by injection of a growth limiting nutrient after injection of cells.

EXAMPLE 6

Parallel Cores Subjected to Plugging

In one experiment, referring to FIG. 2, two steam-cleaned cores 40, 42, both 12.7 cm in length and having porosities of about 17% were utilized. Core A 40 had a permeability of 710 md and core B 42, 120 md. Core A 40 and core B 42 were encased and connected in parallel to a set of reservoirs 44, 46, 48 connected through valves 19 to a pump 50 as seen in FIG. 2.

When brine was initially pumped from the brine reservoir 44 through the parallel cores 40, 42, 76% of the total flow exited from core A 40 and 24% exited from core B 42. A sterile brine containing 5% (w/v) NaCl and suspended Bacillus strain 47 (ATCC No. 39305) prepared as described in Example 3 and at a cell concentration of $10^4$ cells/ml, was then pumped into the cores 40, 42 from the bacteria reservoir 46 for 24 hours. At this point the liquid flow was essentially all diverted to core B 42.

After next backflushing the cores with sterile brine from the backflushing brine reservoir 52 to the backflush container 54, the original flow pattern was essentially restored. Next, a 1:10 diluted nutrient, as described in Example 5, was injected for 19 hours through the cores from the nutrient reservoir 48, and did not alter the relative degrees of fluid flow from that originally observed. After about 30 more hours of dilute nutrient flow, the nutrient in the nutrient reservoir 48 was changed and an undiluted nutrient (as described in Example 5) was injected into the cores 40, 42. Following this injection, the fluid flow pattern of the cores was changed so that 90% of the total flow was delivered as effluent from core B 42. After then sealing the cores for several days without further addition of nutrient, the original flow pattern was restored.

This particular example illustrates the alterations in flow patterns which might be created to alter the flow of water through waterswept zones seen with water-flooded oil field stratification.

In situations of subterranean flow of substances such as pollutants having deleterious environmental effects, into fresh water supplies, the periodic injection of bacterial nutrients, preferably comprising readily assimilable and available nutrients such as molasses, grain worts or grain malts as carbon sources in about a 1% by weight concentration and about a 0.1% by weight concentration of nitrogen sources such as alkali metal nitrates, alkali ammonium salts, protein digests, protein hydrolysates, protein peptones or corn steep liquor could retard pollutant flow into water supplies. Such retardation may also be accomplished by injection of bacteria such as Pseudomonas strain I-2 A(ATCC No. 39304), Bacillus strain 47 (ATCC No. 39305), Bacillus strain BCI-1 (ATCC No. 39306) or other bacteria having suitable growth requirements and characteristics impeding fluid flow. In this situation an acces to subterranean channels of fluid flow could be provided by conventional drilling operations and operations analogous to those seen in the above laboratory-scale examples should impede the outflow of localized contaminating substances.

In the case of stratified waterflooded oil-bearing formations, the same approaches are applicable, with the object somewhat differing and the access being already provided by water input wells.

Bacillus strain BCI-1, being a spore-forming organism, should provide spores when cultured to a late stationary growth phase. Such spores may be produced and isolated by well-known procedures to provide spores suitable for these alterations or blocking of subterranean paths of aqueous flow.

Changes may be made in the various procedures, steps and elements or their arrangements described herein without departing from the concepts and scope of the present invention as defined in the following claims.

What is claimed is:

1. A process for selectively impeding the flow of aqueous fluid through a permeable subterranean formation containing indigenous bacteria, comprising:
   injecting through at least one access into the subterranean formation a quantity of bacterial nutrient capable of sustaining bacterial proliferation, such nutrient comprising a source of metabolizable carbon and a source of metabolizable nitrogen.

2. The process of claim 2, defined further to include:
   sealing any access used to inject bacterial nutrient into the formation for a period between about one day and about ten days after said injection of said nutrient.

3. The process of claim 1 wherein the aqueous fluid is defined further as comprising at least one substance having deleterious environmental effects.

4. The process of claim 3 wherein the source of metabolizable carbon comprises about 1% carbon by weight and is selected from the group consisting of molasses, grain wort and grain malt, and wherein the source of metabolizable nitrogen comprises about 0.1% nitrogen by weight and is selected from the group consisting of alkali metal nitrates, alkali metal ammonium salts, ammonia, protein hydrolysates, protein digests, protein peptones and corn steep liquor.

5. The process of claim 1 wherein the subterranean formation is defined further as being an oil-bearing formation having been subjected to waterflooding and wherein the access from the surface to the subterranean formation is defined further as being at least one input waterflooding well.

6. The process of claim 5, defined further to include:
sealing any access used to inject bacterial nutrient into the formation for a period between about one day and about ten days after said injection of said nutrient.

7. The process of claim 5 wherein the metabolizable carbon comprises about 1% carbon by weight and is selected from the group consisting of molasses, grain wort and grain malt, and wherein the source of metabolizable nitrogen comprises about 0.1% nitrogen by weight and is selected from the group consisting of alkali metal nitrates, alkali metal ammonium salts, ammonia, protein hydrolysates, protein digests, protein peptones and corn steep liquor.

8. The process of claim 7, defined further to include:
sealing any access used to inject bacterial nutrient into the formation for a period between about one day and about ten days after said injection of nutrient.

9. The process of claim 1 wherein the source of metabolizable carbon comprises about 1% carbon by weight and is selected from the group consisting of molasses, grain wort and grain malt, and wherein the source of metabolizable nitrogen comprises about 0.1% nitrogen by weight and is selected from the group consisting of alkali metal nitrates, alkali metal ammonium salts, ammonia, protein hydrolysates, protein digests, protein peptones and corn steep liquor.

10. The process of claim 9, defined further to include:
sealing any access used to inject bacterial nutrient into the formation for a period between about one day and about ten days after said injection of said nutrient.

11. A process for selectively impeding the flow of aqueous fluid through a permeable subterranean formation comprising:
injecting through at least one access into the subterranean formation a quantity of aqueously suspended viable bacteria, such bacteria having the capacity to proliferate in the subterranean formation in the presence of bacterial nutrient;
injecting through at least one access into the bacteria-treated subterranean formation a quantity of diluted bacterial nutrient, such diluted nutrient being capable of sustaining bacterial viability while being inadequate for inducing bacterial proliferation, for dispersing the viable unproliferating bacteria within the formation; and
injecting through at least one access into the bacteria-treated subterranean formation into which diluted nutrient has been injected, a quantity of bacterial nutrient capable of sustaining bacterial proliferation.

12. The process of claim 11, defined further to include:
sealing any access used to inject bacteria and nutrient into the subterranean formation for a period between about one day and about ten days after said injection of nutrient.

13. The process of claim 11, wherein the aqueously suspended viable bacteria are defined further as being Bacillus strain BCI-1.

14. The process of claim 13, defined further to include:
sealing any access used to inject bacteria and nutrient into the subterranean formation for a period between about one day and about ten days after said injection of nutrient.

15. The process of claim 13 wherein the bacterial nutrient comprises a source of metabolizable carbon and a source of metabolizable nitrogen.

16. The process of claim 15, defined further to include:
sealing any access used to inject bacteria and nutrient into the subterranean formation for a period between about one day and about ten days after said injection of nutrient.

17. The process of claim 15 wherein the metabolizable source of carbon comprises about 1% carbon by weight and is selected from the group consisting of molasses, grain wort and grain malt, and wherein the metabolizable source of nitrogen comprises about 0.1% nitrogen by weight and is selected from the group consisting of alkali metal nitrates, alkali metal ammonium salts, ammonia, protein hydrolysates, protein digests, protein peptones and corn steep liquor.

18. The process of claim 11 wherein the aqueously suspended viable bacteria is defined further as being Bacillus strain 47 or Pseudomonas strain I-2.

19. The process of claim 18, defined further to include:
sealing any access used to inject bacteria and nutrient into the subterranean formation for a period between about one day and about ten days after said injection of nutrient.

20. The process of claim 18 wherein the bacterial nutrient comprises a source of metabolizable carbon and a source of metabolizable nitrogen.

21. The process of claim 20, defined further to include:
sealing any access used to inject bacteria and nutrient into the subterranean formation for a period between about one day and about ten days after said injection of nutrient.

22. The process of claim 21 wherein the metabolizable source of carbon comprises about 1% carbon by weight and is selected from the group consisting of molasses, grain wort and grain malt, and wherein the metabolizable source of nitrogen comprises about 0.1% nitrogen by weight and is selected from the group consisting of alkali metal nitrates, alkali metal ammonium salts, ammonia, protein hydrolysates, protein digests, protein peptones and corn steep liquor.

23. The process of claim 11 wherein the bacterial nutrient comprises a source of metabolizable carbon and a source of metabolizable nitrogen.

24. The process of claim 21, defined further to include:
sealing any access used to inject bacteria and nutrient into the subterranean formation for a period between about one day and about ten days after said injection of nutrient.

25. The process of claim 23 wherein the metabolizable source of carbon comprises about 1% carbon by weight and is selected from the group consisting of molasses, grain wort and grain malt, and wherein the metabolizable source of nitrogen comprises about 0.1% nitrogen by weight and is selected from the group consisting of alkali metal nitrates, alkali metal ammonium salts, ammonia, protein hydrolysates, protein digests, protein peptones and corn steep liquor.

26. The process of claim 11 wherein the aqueous fluid is defined further as comprising at least one substance having deleterious environmental effects.

27. The process of claim 26 wherein the bacterial nutrient comprises a source of metabolizable carbon and a source of metabolizable nitrogen.

28. The process of claim 27 wherein the metabolizable source of carbon comprises about 1% carbon by weight and is selected from the group consisting of molasses, grain wort and grain malt, and wherein the metabolizable source of nitrogen comprises about 0.1% nitrogen be weight and is selected from the group consisting of alkali metal nitrates, alkali metal ammonium salts, ammonia, protein hydrolysates, protein digests, protein peptones and corn steep liquor.

29. The process of claim 26 wherein the aqueously suspended viable bacteria is defined further as being Bacillus strain 47 or Pseudomonas strain I-2.

30. The process of claim 29 wherein the bacterial nutrient comprises a source of metabolizable carbon and a source of metabolizable nitrogen.

31. The process of claim 30 wherein the metabolizable source of carbon comprises about 1% carbon by weight and is selected from the group consisting of molasses, grain wort and grain malt, and wherein the metabolizable source of nitrogen comprises about 0.1% nitrogen by weight and is selected from the group consisting of alkali metal nitrates, alkali metal ammonium salts, ammonia, protein hydrolysates, protein digests, protein peptones and corn steep liquor.

32. The process of claim 26, wherein the aqueously suspended viable bacteria is defined further as being Bacillus strain BCI-1.

33. The process of claim 32 wherein the bacterial nutrient comprises a source of metabolizable carbon and a source of metabolizable nitrogen.

34. The process of claim 33 wherein the metabolizable source of carbon comprises about 1% carbon by weight and is selected from the group consisting of molasses, grain wort and grain malt, and wherein the metabolizable source of nitrogen comprises about 0.1% nitrogen by weight and is selected from the group consisting of alkali metal nitrates, alkali metal ammonium salts, ammonia, protein hydrolysates, protein digests, protein peptones and corn steep liquor.

35. The process of claim 11 wherein the subterranean formation is defined further as being an oil-bearing formation having been subjected to waterflooding and wherein the access from the surface to the subterranean formation is defined further as being at least one input waterflooding well.

36. The process of claim 35, defined further to include:
sealing any access used to inject bacteria and nutrient into the subterranean formation for a period between about one day and about ten days after the injection of nutrient.

37. The process of claim 35, wherein the aqueously suspended viable bacteria is defined further as being Bacillus strain BCI-1.

38. The process of claim 37, defined further to include:
sealing any access used to inject bacteria and nutrient into the subterranean formation for a period between about one day and about ten days after said injection of nutrient.

39. The process of claim 37 wherein the bacterial nutrient comprises a source of metabolizable carbon and a source of metabolizable nitrogen.

40. The process of claim 39, defined further to include:
sealing any access used to inject bacteria and nutrient into the subterranean formation for a period between about one day and about ten days after said injection of nutrient.

41. The process of claim 39 wherein the metabolizable source of carbon comprises about 1% carbon by weight and is selected from the group consisting of molasses, grain wort and grain malt, and wherein the metabolizable source of nitrogen comprises about 0.1% nitrogen by weight and is selected from the group consisting of alkali metal nitrates, alkali metal ammonium salts, ammonia, protein hydrolysates, protein digests, protein peptones and corn steep liquor.

42. The process of claim 35 wherein the bacterial nutrient comprises a source of metabolizable carbon and a source of metabolizable nitrogen.

43. The process of claim 42, defined further to include:
sealing any access used to inject bacteria and nutrient into the subterranean formation for a period between about one day and about ten days after said injection of nutrient.

44. The process of claim 42 wherein the metabolizable source of carbon comprises about 1% carbon by weight and is selected from the group consisting of molasses, grain wort and grain malt, and wherein the metabolizable source of nitrogen comprises about 0.1% nitrogen by weight and is selected from the group consisting of alkali metal nitrates, alkali metal ammonium salts, ammonia, protein hydrolysates, protein digests, protein peptones and corn steep liquor.

45. The process of claim 35 wherein the aqueously suspended viable bacteria is defined further as being Bacillus strain 47 or Pseudomonas I-2.

46. The process of claim 45, defined further to include:
sealing any access used to inject bacteria and nutrient into the subterranean formation for a period between about one day and about ten days after said injection of nutrient.

47. The process of claim 45 wherein the bacterial nutrient comprises a source of metabolizable carbon and a source of metabolizable nitrogen.

48. The process of claim 47, defined further to include:
sealing any access used to inject bacteria and nutrient into the subterranean formation for a period between about one day and about ten days after said injection of nutrient.

49. The process of claim 47 wherein the metabolizable source of carbon comprises about 1% carbon by weight and is selected from the group consisting of molasses, grain wort and grain malt, and wherein the metabolizable source of nitrogen comprises about 0.1% nitrogen by weight and is selected from the group consisting of alkali metal nitrates, alkali metal ammonium salts, ammonia, protein hydrolysates, protein digests, protein peptones and corn steep liquor.

50. A process for selectively impeding the flow of aqueous fluid through a permeable subterranean formation comprising:

injecting through at least one access into the subterranean formation a quantity of the aqueously suspended bacterial spores having the capacity to germinate in the subterranean formation in the presence of bacterial nutrient;

injecting through at least one access into the subterranean formation a quantity of brine, such brine being capable of sustaining spore viability while being inadequate for inducing spore germination, for dispersing the viable but unproliferating spores within the formation; and injecting through at least one access into the spore-treated subterranean formation into which the brine has been injected a quantity of bacterial nutrient capable of inducing spore germination and sustaining bacterial proliferation.

51. The process of claim 50, defined further to include:

sealing any access used to inject spores and nutrient into the subterranean formation for a period between about one day and about ten days after said injection of nutrient.

52. The process of claim 50, wherein the aqueously suspended bacterial spores are defined further as being spores of Bacillus strain BCI-1.

53. The process of claim 52, defined further to include:

sealing any access used to inject spores and nutrient into the subterranean formation for a period between about one day and about ten days after said injection of nutrient.

54. The process of claim 52 wherein the bacterial nutrient comprises a source of metabolizable carbon and a source of metabolizable nitrogen.

55. The process of claim 54, defined further to include:

sealing any access used to inject spores and nutrient into the subterranean formation for a period between about one day and about ten days after said injection of nutrient.

56. The process of claim 52 wherein the metabolizable source of carbon comprises about 1% carbon by weight and is selected from the group consisting of molasses, grain wort and grain malt, and wherein the metabolizable source of nitrogen comprises about 0.1% nitrogen by weight and is selected from the group consisting of alkali metal nitrates, alkali metal ammonium salts, ammonia, protein hydrolysates, protein digests, protein peptones and corn steep liquor.

57. The process of claim 50 wherein the bacterial nutrient comprises a source of metabolizable carbon and a source of metabolizable nitrogen.

58. The process of claim 57, defined further to include:

sealing any access used to inject spores and nutrient into the subterranean formation for a period between about one day and about ten days after said injection of nutrient.

59. The process of claim 57 wherein the metabolizable source of carbon comprises about 1% carbon by weight and is selected from the group consisting of molasses, grain wort and grain malt, and wherein the metabolizable source of nitrogen comprises about 0.1% nitrogen by weight and is selected from the group consisting of alkali metal nitrates, alkali metal ammonium salts, ammonia, protein hydrolysates, protein digests, protein peptones and corn steep liquor.

60. The process of claim 50 wherein the aqueous fluid is defined further as comprising at least one substance having deleterious environmental effects.

61. The process of claim 60 wherein the bacterial nutrient comprises a source of metabolizable carbon and a source of metabolizable nitrogen.

62. The process of claim 61 wherein the metabolizable source of carbon comprises about 1% carbon by weight and is selected from the group consisting of molasses, grain wort and grain malt, and wherein the metabolizable source of nitrogen comprises about 0.1% nitrogen by weight and is selected from the group consisting of alkali metal nitrates, alkali metal ammonium salts, ammonia, protein hydrolysates, protein digests, protein peptones and corn steep liquor.

63. The process of claim 60, wherein the aqueously suspended bacterial spores are defined further as being spores of Bacillus strain BCI-1.

64. The process of claim 63 wherein the bacterial nutrient comprises a source of metabolizable carbon and a source of metabolizable nitrogen.

65. The process of claim 64 wherein the metabolizable source of carbon comprises about 1% carbon by weight and is selected from the group consisting of molasses, grain wort and grain malt, and wherein the metabolizable source of nitrogen comprises about 0.1% nitrogen by weight and is selected from the group consisting of alkali metal nitrates, alkali metal ammonium salts, ammonia, protein hydrolysates, protein digests, protein peptones and corn steep liquor.

66. The process of claim 50 wherein the subterranean formation is defined further as being an oil-bearing formation having been subjected to waterflooding and wherein the access from the surface to the subterranean formation is defined further as being at least one input waterflooding well.

67. The process of claim 66, defined further to include:

sealing any access used to inject spores and nutrient into the subterranean formation for a period between about one day and about ten days after said injection of nutrient.

68. The process of claim 66, wherein the aqueously suspended spores are defined further as being spores of Bacillus strain BCI-1.

69. The process of claim 68, defined further to include:

sealing any access used to inject spores and nutrient into the subterranean formation for a period between about one day and about ten days after said injection of nutrient.

70. The process of claim 68 wherein the bacterial nutrient comprises a source of metabolizable carbon and a source of metabolizable nitrogen.

71. The process of claim 70, defined further to include:

sealing any access used to inject spores and nutrient into the subterranean formation for a period between about one day and about ten days after said injection of nutrient.

72. The process of claim 70 wherein the metabolizable source of carbon comprises about 1% carbon by weight and is selected from the group consisting of molasses, grain wort and grain malt, and wherein the metabolizable source of nitrogen comprises about 0.1% nitrogen by weight and is selected from the group consisting of alkali metal nitrates, alkali metal ammonium salts, ammonia, protein hydrolysates, protein digests, protein peptones and corn steep liquor.

73. The process of claim 66 wherein the bacterial nutrient comprises a source of metabolizable carbon and a source of metabolizable nitrogen.

74. The process of claim 73, defined further to include:

sealing any access used to inject spores and nutrient into the subterranean formation for a period between about one day and about ten days after said injection of nutrient.

75. The process of claim 73 wherein the metabolizable source of carbon comprises about 1% carbon by weight and is selected from the group consisting of molasses, grain wort and grain malt, and wherein the metabolizable source of nitrogen comprises about 0.1% nitrogen by weight and is selected from the group consisting of alkali metal nitrates, alkali metal ammonium salts, ammonia, protein hydrolysates, protein digests, protein peptones and corn steep liquor.

* * * * *

UNITED STATES PATENT AND TRADEMARK OFFICE
CERTIFICATE OF CORRECTION

PATENT NO. : 4,558,739
DATED : December 17, 1985
INVENTOR(S) : Michael J. McInerney, et al.

It is certified that error appears in the above-identified patent and that said Letters Patent is hereby corrected as shown below:

In the title, immediately preceding the word "SITU", please insert the word --IN--.

In addition to inventors listed on patent, please add: --David E. Revus, Yorba Linda, California; Douglas M. Munnecke, Montara, California; and J. Bennett Clark, Bartlesville, Oklahoma--.

Column 8, line 27, the word "acces" should be --access--.

Column 8, line 56, immediately following the word "claim" should be the numeral --1--.

Signed and Sealed this

Twenty-fifth Day of March 1986

[SEAL]

Attest:

DONALD J. QUIGG

Attesting Officer

Commissioner of Patents and Trademarks